Patented Feb. 17, 1953

2,628,888

UNITED STATES PATENT OFFICE 2,628,888

CHEMICAL PROCESS FOR THE PRODUCTION OF AN ACID SALT OF HYDROXYLAMINE

Richard Edward Benson, Claymont, Del., assignor to E. I. du Pont de Nemours & Company, Wilmington, Del., a corporation of Delaware No Drawing. Application November 8, 1950, Serial No. 194,735

3 Claims. (Cl. 23—101)

This invention relates to a new process for preparing hydroxylamine.

Hydroxylamine has long been regarded as a potentially important chemical intermediate in a wide variety of organic and inorganic syntheses. However, despite its versatility in preparing a varied group of useful compounds, this material has not been exploited appreciably in the field of industrial chemistry due to its high cost, which is in turn traceable to the lack of a cheap, commercial synthesis for this material. Even now, despite the vast advances made in chemical technology, this compound is available commercially from only one supplier and at prices so high (approximately $1.20 to $1.85 per pound) as to prohibit its use in all but a few applications.

Several methods have been uncovered in the past for the preparation of hydroxylamine, for instance, through the electrolysis of nitrates, through the acid hydrolysis of primary nitroparaffins, and through hydrolysis of the sulfonate prepared by the reaction between sodium bisulfite, sodium nitrite and sulfur dioxide under slightly alkaline conditions. However, for various reasons, such as low yields, poor conversions, costly raw materials, and high operating and equipment costs, these methods cannot be used to produce low-cost hydroxylamine in appreciable concentrations.

Several investigators, notably Butterworth and Partington, Trans. Faraday Soc., 26, 144 (1930); Jouve, Compt. rend. 128, 435 (1899); and Cooke, Proc. Phil. Soc., Glasgow, 18, 291 (1887); have demonstrated the fact that hydroxylamine can be prepared directly by the catalytic hydrogenation of nitric oxide. However, despite the fact that the raw materials required are cheap, the various methods reported by these investigators do not represent successful commercial syntheses since only very low conversions and yields (about 2–3%) are obtained. Thus, it would be necessary to concentrate the reaction mixtures produced quite thoroughly, e. g., a reduction in volume of the order of 15 to 25 fold, before the product could be obtained in useful concentrations. Such a procedure has not proven possible due to the high rate of thermal decomposition of free hydroxylamine. Furthermore, even if methods were worked out to successfully accomplish such a concentration, the high operational costs due to the volume of solutions and solvents necessarily handled and the equipment restrictions necessarily involved in avoiding appreciable decomposition of the product would make it impossible to produce low-cost hydroxylamine.

In the applicant's copending application S. N. 112,841, filed August 27, 1949, it is pointed out that platinum in strong acidic solution (i. e., pH less than 2.50 and preferably less than 2.25) serves as a surprisingly efficient heterogeneous catalyst for the hydrogenation of nitric oxide to hydroxylamine, provided that the mole ratio of nitric oxide to hydrogen is less than 1, preferably in the range 0.87 (1:1.5) to 0.167 (1:6.0)— the hydroxylamine being obtained as the salt of the strong acid used. It has been found that other of the noble metals, particularly those of the second and third triads of group VIII, surprisingly differ completely from platinum in their efficacy as heterogeneous catalysts for this hydrogenation.

More specifically, it has been found that ruthenium and iridium, for instance, when used as catalysts in this hydrogenation under the same general conditions found to be so amazingly effective in the case of platinum (i. e., strong acidic medium with a mole ratio of nitric oxide to hydrogen less than 1) surprisingly do not produce even traces of hydroxylamine acid salt. The remaining metals of group VIII, i. e., the members of the first triad, iron, cobalt, and nickel, are, of course, completely inoperative as heterogeneous catalysts for this hydrogenation, since under the conditions used, the metals readily dissolve in the reaction medium and thus obviate any possibility of heterogeneous catalysis.

It is an object of the present invention to provide a more economical and commercially practical method of preparing hydroxylamine. A further object is to provide a method of preparing hydroxylamine which requires only simple equipment, yet produces a good yield. An additional object is to provide a method of preparing hydroxylamine from low cost, readily available materials. Other objects will appear from the following detailed description of the invention.

In direct contradiction to the prior art findings noted, I have found that the foregoing objects are attained by the hydrogenation, at temperatures ranging from the various freezing points of the reaction mixture to 80° C., of nitric oxide in the presence of a palladium catalyst and a strong mineral acid, the molar ratio of nitric oxide to hydrogen being less than 1. For the highest yields and best conversions, it is preferred to carry out the hydrogenation reaction at temperatures in the range of 0° C. to 30° C. at a pH of less than 2 and with a molar ratio of nitric oxide to hydrogen ranging from about 1:2 to 1:6. The hydroxylamine is isolated from the process of this invention as the salt of the acid used in the reaction mixture. The improved process of this invention, using, as it does, very cheap, readily available raw materials and requiring no complicated reaction vessels and, in fact, no purification stages whatsoever, thus makes it possible to produce hydroxylamine at an attractive price.

The following examples in which the parts given are by weight unless otherwise indicated are submitted to further illustrate and not to limit this invention:

Example I

A glass reactor, fitted with an air-cooled condenser, a sealed stirrer, a thermometer, and a fritted glass gas inlet tube connected through a suitable mixing vessel to sources of gaseous hydrogen and nitric oxide and so arranged that the input of both gases can be separately measured, is charged with 376 parts of a 10% aqueous hydrochloric acid solution and 1 part of 10% palladium-on-charcoal catalyst. Hydrogen is passed into the reaction mixture at 150–250 parts by volume per minute at 40–45° C. for 10 minutes, and the reaction vessel then cooled to 31° C. The input hydrogen rate is then adjusted to 159 parts by volume per minute and nitric oxide admitted to the reaction zone at a rate of 39 parts by volume per minute over a period of one hour at 31–33° C. with vigorous stirring. The reaction is continued for an additional two hours at a temperature ranging from 30–31° C. with nitric oxide and hydrogen being admitted to the reaction zone at rates, respectively of 37–40 and 158–160 parts by volume per minute. The reaction mixture is then cooled to 2 to 3° C. and the reaction continued for an additional three hours at this temperature with nitric oxide and hydrogen being admitted to the reaction zone at rates, respectively, of 39–40 and 150–154 parts by volume per minute.

During the reaction period the off gases from the reactor are metered and samples collected every hour and analyzed for nitric oxide content. In this manner the per cent of nitric oxide reacted is obtained. These results are summarized in the following table:

| Reaction Time, Hours | Temp., °C. | Parts of NO by Vol./Min. | Parts of Hydrogen by Vol./Min. | Off Gas Parts by Vol./Min. | Avg. Per-cent NO (Off Gas) | Avg. Per-cent NO Reacted |
|---|---|---|---|---|---|---|
| 0–1 | 33 | 39 | 159 | 172 | 10.1 | 55.2 |
| 1–2 | 31 | 40 | 160 | 166 | 9.2 | 61.7 |
| 2–3 | 31 | 37 | 158 | 159 | 5.5 | 76.5 |
| 3–4 | 3 | 39 | 150 | 184 | 12.4 | 41.5 |
| 4–5 | 2 | 39 | 154 | 181 | 12.9 | 40.0 |
| 5–6 | 2 | 40 | 153 | 183 | 12.6 | 42.3 |

From the above table the average nitric oxide utilization is 53.0% and there is a total of 13,960 parts by volume of nitric oxide admitted into the reaction zone.

At the end of the six-hour reaction period the admission of nitric oxide to the reaction zone is stopped and the system flushed with hydrogen for ten minutes and finally with nitrogen. After filtration of the reaction mixture to remove the catalyst, there is obtained 324 parts of a hydrochloric acid solution of hydroxylamine. A 7.0054 part sample of this solution, when treated with a solution containing an excess of ferric ions produces a solution containing sufficient ferrous ions to require 21.8 parts by volume of a 0.1069 N potassium permanganate solution to oxidize back to the ferric ion stage. This corresponds to a total of 1.79 parts of hydroxylamine in the reaction mixture, which, based on the nitric oxide combined using the above given average nitric oxide conversion of 53%, represents 17.9% of the theoretical yield of hydroxylamine, obtained as the hydrochloride. Another sample of the reaction mixture analyzed similarly yields identical results.

Example II

Another reaction is carried out utilizing the same equipment and operating procedure as described in Example I but varying in that nitric oxide and hydrogen are admitted to the reaction zone at rates, respectively, of 49–53 and 102–115 parts by volume per minute. In this instance, there is obtained a 6.7% yield of hydroxylamine as the hydrochloride at an average nitric oxide conversion of 18%.

Example III

Another reaction is carried out again utilizing the same equipment and operating procedure except that in this case the initial temperature range is 28–29° C., and the gaseous nitric oxide and hydrogen are admitted to the reaction zone at rates, respectively, of 35–38 and 122–128 parts by volume per minute. From this reaction, there is obtained a 14% yield of hydroxylamine again obtained as the hydrochloride at an average nitric oxide conversion of 45%.

Example IV

Another reaction is carried out in the same equipment and manner as previously described except that the reaction temperature is increased from 31° C. to 79° C. over a period of 5 hours with nitric oxide and hydrogen being admitted to the reaction zone at rates, respectively, of 40–42 and 166–169 parts by volume per minute. In this reaction, 13.7% of the nitric oxide introduced into the reaction vessel is converted to hydroxylamine—again as the hydrochloride.

The importance of pH in this reaction has already been mentioned. At values of pH appreciably greater than 7, only relatively small quantities of hydroxylamine can be prepared by this reaction procedure. Best results in this synthesis are obtained by operating at a pH below 2, e. g., in the range from 0.01 to 2.

The acids which have been used successfully are the common, strong, inorganic, i. e., mineral acids, e. g., hydrochloric, nitric, sulfuric, and phosphoric acids.

As has been mentioned previously, it is important that a careful control be maintained of the relative proportions of nitric oxide and hydrogen being used in the reaction mixture. For best results it is necessary that nitric oxide to hydrogen ratios less than one and preferably from 1:3 to 1:6 be used, although ratios as low as 1:2 or slightly lower are still operable. In the most preferred range of 1:3 to 1:4 maximum yields and conversions are obtained in the preferred pH and temperature ranges irrespective of other operating conditions, provided that the reactants are adequately mixed, preferably using vigorous agitation.

As previously pointed out, this reaction can be carried out successfully, either batchwise or continuously, at temperatures ranging from 0° C. to 80° C. The freezing point of the reaction mixture will, of course, vary with the nature and amount of the acid being used as well as the amount of hydroxylamine present. For maximum conversions and yields, temperatures in the range 0° to 30° C., and from a cost viewpoint temperatures from 5° to 30° C., are preferred. Reaction conditions similar to those given in Example I are those preferred in continuous operations, although operation under superatmospheric pressure is also possibly carried out in a continuous fashion.

The efficiency and success of this reaction are nowise dependent on operating pressures. The reaction is equally efficient, in the preferred ranges of temperature, pH and nitric oxide to hydrogen ratios, at atmospheric pressures as well as at 1,000 lb./sq. in. pressures or higher. From the standpoint of simplicity of equipment, it is preferable to operate in the range of from 1 to 50 lb./sq. in. In this connection, it should be mentioned that in those reactions involving the handling of nitric oxide/hydrogen gas mixtures under pressures appreciably above atmospheric, for example, over 50 lb./sq. in., especially in the relative proportions previously mentioned as preferred in the process of this invention, extreme care should be taken since it is known that these mixtures are potentially explosive.

Although only palladium-on-charcoal catalysts are mentioned in the examples, palladium catalysts of various types known in the art can be used, for instance, metallic palladium itself, palladium-on-kieselguhr, or palladium on any one of the known acid-resistant catalyst carriers, palladinized or not.

Hydroxylamine is well known to the chemical art as a valuable intermediate in the preparation of a number of chemical compounds. Hydroxylamine prepared by the process of this invention can be used in many reactions described in the literature for this compound. As pointed out previously, the process of this invention leads to the direct preparation of the hydroxylamine acid salt with whatever acid is being used. If free hydroxylamine is desired, it can be readily obtained from the hydroxylamine acid salt by direct neutralization with a strong base such as, sodium hydroxide. Because of the greater stability and resistance to degradation of the hydroxylamine acid salts, and the correspondingly greater ease in using them, they are commercially the normal form in which hydroxylamine is used.

While the invention has been described in detail in the foregoing, it will be appreciated that the examples given are illustrative only and that many variations may be made by the skilled chemists without departure from the scope of the present invention. Accordingly, I intend to be limited only by the following claims.

I claim:

1. A process for the catalytic hydrogenation of nitric oxide to produce an acid salt of hydroxylamine which comprises catalytically hydrogenating nitric oxide with elemental hydrogen in a medium consisting essentially of water, a palladium catalyst and a strong mineral acid, said medium having a pH of less than 2 and being maintained at a temperature between the freezing point of the reaction mixture and 80° C., the molar ratio of the nitric oxide to the elemental hydrogen present being less than 1.

2. A process as claimed in claim 1, wherein the molar ratio of nitric oxide to hydrogen is in the range from 1:2 to 1:6.

3. A process as claimed in claim 1 wherein the temperature is maintained between 0° C. and 30° C.

RICHARD EDWARD BENSON.

REFERENCES CITED

The following references are of record in the file of this patent:

Mellor's "A Comprehensive Treatise on Inorganic and Theoretical Chemistry," vol. 8, pages 279, 280, 285–287, Longmans, Green and Co., N. Y.

Mellor's "Modern Inorganic Chemistry," pp. 638, 639, 665. Single volume ed., New Impression of Eighth Ed., Jan. 1935, Longmans, Green and Co., N. Y.

McPherson and Henderson's "A Course in General Chemistry," pp. 681, 683; third edition, Ginn and Co., N. Y.

Butterworth and Partington, Trans. Faraday Soc., vol. 26, pp. 144–147 (1930).

Cooke, Proc. Phil. Soc., Glasgow, vol. 18, pages 291–293 (1886–1887).

Jones's "Inorganic Chemistry," 1947 ed., page 710, The Blakiston Co., Philadelphia.